United States Patent
Li

(10) Patent No.: US 11,625,164 B2
(45) Date of Patent: Apr. 11, 2023

(54) DISPLAY METHOD AND TERMINAL DEVICE

(71) Applicant: VIVO MOBILE COMMUNICATION CO., LTD., Guangdong (CN)

(72) Inventor: Feng Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/534,296

(22) Filed: Nov. 23, 2021

(65) Prior Publication Data
US 2022/0083189 A1    Mar. 17, 2022

Related U.S. Application Data

(63) Continuation of application No. PCT/CN2020/085100, filed on Apr. 16, 2020.

(30) Foreign Application Priority Data

May 24, 2019  (CN) .......................... 201910441854.6

(51) Int. Cl.
  *G06F 3/041*   (2006.01)
  *G06F 3/0487*  (2013.01)
  *H04M 1/02*    (2006.01)

(52) U.S. Cl.
  CPC ........ *G06F 3/0487* (2013.01); *H04M 1/0268* (2013.01)

(58) Field of Classification Search
  CPC .... G06F 1/1652; G06F 1/1677; G06F 3/0482; G06F 3/0488; G06F 2203/04102; G06F 2203/04803; G09G 2380/02; G09F 9/301; H04M 1/0214; H04M 1/0241; H04M 1/0268
  See application file for complete search history.

(56) References Cited

U.S. PATENT DOCUMENTS

| 2014/0055429 A1 | 2/2014 | Kwon et al. |
| 2014/0062976 A1 | 3/2014 | Park et al. |

(Continued)

FOREIGN PATENT DOCUMENTS

| CN | 103258491 A | 8/2013 |
| CN | 104583908 A | 4/2015 |
| CN | 104965355 A | 10/2015 |

(Continued)

OTHER PUBLICATIONS

International Search Report of International Application No. PCT/CN2020/085100 dated Jul. 21, 2020.

(Continued)

*Primary Examiner* — Joe H Cheng
(74) *Attorney, Agent, or Firm* — IP & T Group LLP

(57) ABSTRACT

A display method includes: in a case that a first area of a screen displays a running interface of a first application, receiving a bending operation performed by a user for the terminal; and in response to the bending operation, displaying a target mark in a second area of the screen, and displaying the running interface of the first application in a third area of the screen. The third area does not overlap the second area, and the target mark is used to indicate at least one of an unread message, a second application, or a target function.

20 Claims, 5 Drawing Sheets

(56) References Cited

U.S. PATENT DOCUMENTS

2016/0085319 A1   3/2016  Kim et al.
2017/0115944 A1   4/2017  Oh et al.

FOREIGN PATENT DOCUMENTS

| | | | | | |
|---|---|---|---|---|---|
| CN | 105843464 | A | | 8/2016 | |
| CN | 107015777 | A | | 8/2017 | |
| CN | 107728885 | A | | 2/2018 | |
| CN | 107765773 | A | | 3/2018 | |
| CN | 107765959 | A | | 3/2018 | |
| CN | 107765968 | A | | 3/2018 | |
| CN | 107870716 | A | * | 4/2018 | ........... G06F 3/0482 |
| CN | 107870716 | A | | 4/2018 | |
| CN | 110162254 | A | | 8/2019 | |
| CN | 111258480 | A | * | 6/2020 | |
| CN | 108494958 | B | * | 1/2021 | ........ H04M 1/72555 |

OTHER PUBLICATIONS

Written Opinion of The International Searching Authority of International Application No. PCT/CN2020/085100 dated Jul. 21, 2020.
First Office Action of Priority Application No. 201910441854.6 dated May 28, 2020.
The Second Office Action of Priority Application No. 201910441854.6 dated Aug. 14, 2020.
The Third Office Action of Priority Application No. 201910441854.6 dated Nov. 5, 2020.

* cited by examiner

DISPLAY METHOD AND TERMINAL DEVICE

CROSS-REFERENCE TO RELATED APPLICATIONS

This application is a Bypass Continuation Application of PCT/CN2020/085100, filed on Apr. 16, 2020, which claims priority to Chinese Patent Application No. 201910441854.6 filed on May 24, 2019, which are incorporated herein by reference in their entirety.

TECHNICAL FIELD

This application relates to the field of mobile terminal technologies, and in particular, to a display method and a terminal device.

BACKGROUND

In the mobile Internet era, terminal products have become an indispensable commodity in people's daily life. A user may view played content, such as a video, by using a screen of the terminal product.

Based on this, in various display manners in a related technology, it is difficult for the user to avoid a case in which another factor occupies an application (App) running interface, for example, a received unread message or a control icon of the application. Therefore, a related display manner affects visual experience of the user when using an application.

SUMMARY

An objective of the embodiments of the present disclosure is to provide a display method and terminal device.

According to a first aspect, some embodiments of the present disclosure provide a display method, applied to a terminal and including: in a case that a first area of a screen displays a running interface of a first application, receiving a bending operation performed by a user for the terminal; and in response to the bending operation, displaying a target mark in a second area of the screen, and displaying the running interface of the first application in a third area of the screen, where the third area does not overlap the second area; where the target mark is used to indicate at least one of an unread message, a second application, or a target function.

According to a second aspect, some embodiments of the present disclosure provide a terminal device, including: a receiving module, configured to: in a case that a first area of a screen displays a running interface of a first application, receive a bending operation performed by a user for the terminal; and a display module, configured to: in response to the bending operation, display a target mark in a second area of the screen, and display the running interface of the first application in a third area of the screen, where the third area does not overlap the second area; where the target mark is used to indicate at least one of an unread message, a second application, or a target function.

According to a third aspect, some embodiments of the present disclosure further provide a mobile terminal, including a processor, a memory, and a program that is stored in the memory and executable on the processor, and when the program is executed by the processor, steps of the method in the first aspect are implemented.

According to a fourth aspect, some embodiments of the present disclosure provide a non-transitory computer-readable storage medium, where the non-transitory computer-readable storage medium is configured to store a computer-executable instruction, and when the computer-executable instruction is executed by a processor, steps of the method in the first aspect are implemented.

BRIEF DESCRIPTION OF DRAWINGS

To describe the technical solutions of the embodiments of the present disclosure or the conventional technology more clearly, the following briefly describes the accompanying drawings required for describing the embodiments or the conventional technology. Apparently, the accompanying drawings in the following descriptions show merely some embodiments of the present disclosure, and a person of ordinary skill in the art may still derive other drawings from these accompanying drawings.

DESCRIPTION OF EMBODIMENTS

To enable a person skilled in the art to better understand the technical solutions in the present application, the following clearly describes the technical solutions in some embodiments of the present disclosure with reference to the accompanying drawings in some embodiments of the present disclosure. Apparently, the described embodiments are merely some rather than all of the embodiments of the present application. Based on the embodiments of the present application, all other embodiments obtained by a person of ordinary skill in the art should fall within the protection scope of this application.

Figure 1:
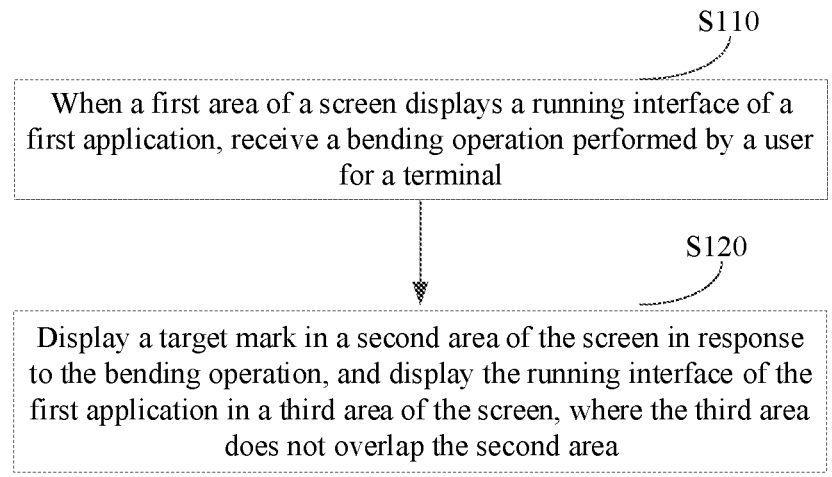
FIG. 1 is a schematic flowchart of a display method according to some embodiments of the present disclosure.

FIG. 1 is a schematic flowchart of a display method according to some embodiments of the present disclosure. The method may be performed by an electronic device, for example, a terminal device. In other words, the method may be performed by software or hardware installed on the terminal device. As shown in the figure, the method may include the following steps.

S110: In a case that a first area of a screen displays a running interface of a first application, receive a bending operation performed by a user for the terminal.

The terminal device has a flexible screen. The flexible screen is a screen made of a material such as an organic light-emitting diode (OLED), and is characterized by a capability of being bendable (collapsible).

The first application may include, for example, a video APP or a game APP. When the screen of the terminal is in an unbent state, when the first area of the screen displays the running interface of the first application, the bending operation performed by the user for the terminal is received.

S120: In response to the bending operation, display a target mark in a second area of the screen, and display the running interface of the first application in a third area of the screen, where the third area does not overlap the second area.

The target mark is used to indicate at least one of an unread message, a second application, or a target function.

In an implementation, the target function is a basic function in an operating system of the terminal device, and includes at least one of an identity authentication function, a terminal shutdown function, a terminal restarting function, enabling a preset application, parameter adjustment, unlocking the terminal device, locking the terminal device, or the like.

In an implementation, the second application may include a common application, the first application, and the like. In another implementation, the second application is an application associated with the first application, and the application associated with the first application may include an application of a same type as the first application, an application developed by a same developer as the first application, an application in an invoking relationship with the first application, and the like. In another implementation, the second application is an application that is started for more times in a preset time period, or the second application is an application running in the background.

In an implementation, when the target mark is used to indicate multiple of an unread message, a second application, and a target function, target marks do not overlap in the second area, thereby further improving visual experience of the user and preventing the user from misoperation.

Therefore, in the display method provided in some embodiments of the present disclosure, the target mark and the running interface of the first application can be separately displayed by using areas that are not overlapped with each other, to prevent the user's vision from being disturbed when the running interface of the first application is displayed, and visual experience of the user is improved.

Figure 2:
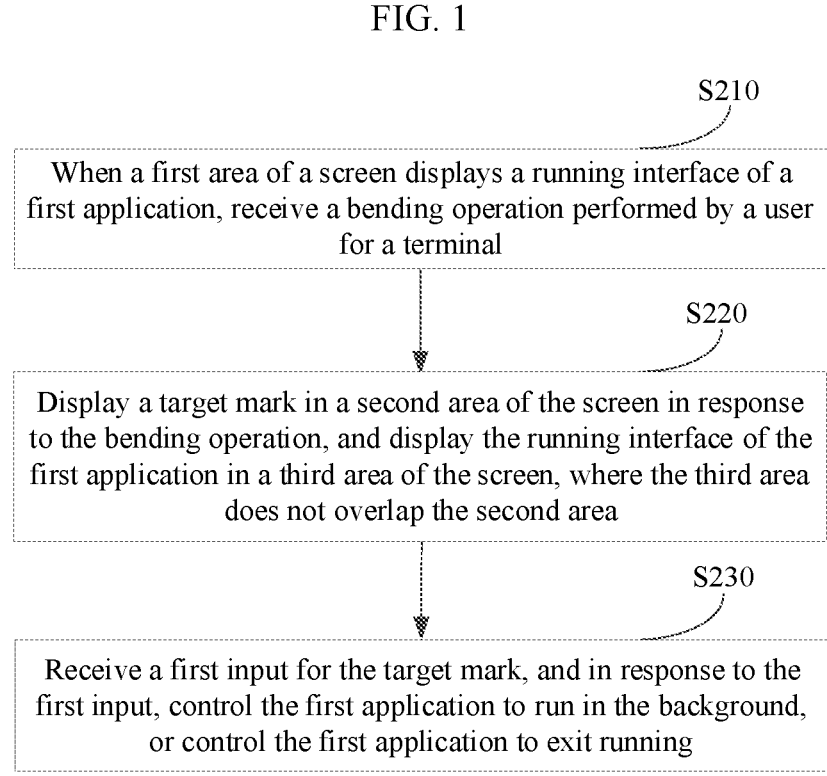
FIG. 2 is another schematic flowchart of a display method according to some embodiments of the present disclosure.

FIG. 2 is another schematic flowchart of a display method according to some embodiments of the present disclosure. The method may be performed by an electronic device, for example, a terminal device. In other words, the method may be performed by software or hardware installed on the terminal device. As shown in the figure, the method may include the following steps.

S210: In a case that a first area of a screen displays a running interface of a first application, receive a bending operation performed by a user for the terminal.

The terminal device has a flexible screen. The flexible screen is a screen made of a material such as an organic light-emitting diode (OLED), and is characterized by a capability of being bendable (collapsible).

The first application may include, for example, a video APP or a game APP. When the screen of the terminal is in an unbent state, when the first area of the screen displays the running interface of the first application, the bending operation performed by the user for the terminal is received.

S220: In response to the bending operation, Display a target mark in a second area of the screen, and display the running interface of the first application in a third area of the screen, where the third area does not overlap the second area.

The target mark is used to indicate a second application, and the second application is the same as the first application.

S230: Receive a first input for the target mark, and in response to the first input, control the first application to run in the background, or control the first application to exit running.

Therefore, in the display method provided in some embodiments of the present disclosure, the target mark and the running interface of the first application can be separately displayed by using areas that are not overlapped with each other, to prevent the user's vision from being disturbed when the running interface of the first application is displayed, and visual experience of the user is improved. In addition, the target mark can make it convenient to control the first application, and a user operation is facilitated.

In another implementation, the second application is an application associated with the first application, and the application associated with the first application may include an application of a same type as the first application, an application developed by a same developer as the first application, an application in an invoking relationship with the first application, and the like. In another implementation, the second application is an application that is started for more times in a preset time period, or the second application is an application running in the background. In this case, the user may invoke the second application by using the target mark, to facilitate the user operation.

Figure 3:
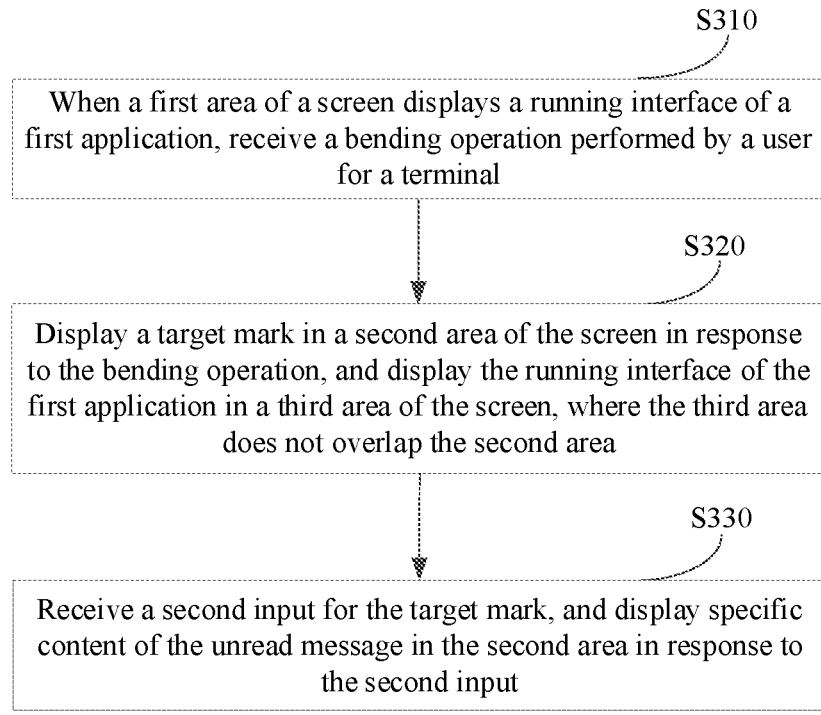
FIG. 3 is another schematic flowchart of a display method according to some embodiments of the present disclosure.

FIG. 3 is another schematic flowchart of a display method according to some embodiments of the present disclosure. The method may be performed by an electronic device, for example, a terminal device. In other words, the method may be performed by software or hardware installed on the terminal device. As shown in the figure, the method may include the following steps.

S310: In a case that a first area of a screen displays a running interface of a first application, receive a bending operation performed by a user for the terminal.

The terminal device has a flexible screen. The flexible screen is a screen made of a material such as an organic light-emitting diode (OLED), and is characterized by a capability of being bendable (collapsible).

The first application may include, for example, a video APP or a game APP. When the screen of the terminal is in an unbent state, when the first area of the screen displays the running interface of the first application, the bending operation performed by the user for the terminal is received.

S320: In response to the bending operation, display a target mark in a second area of the screen, and display the running interface of the first application in a third area of the screen, where the third area does not overlap the second area.

The target mark is used to indicate an unread message.

S330: Receive a second input for the target mark, and display specific content of the unread message in the second area in response to the second input.

Therefore, in the display method provided in some embodiments of the present disclosure, the target mark and the running interface of the first application can be separately displayed by using areas that are not overlapped with each other, to prevent the user's vision from being disturbed when the running interface of the first application is displayed, and visual experience of the user is improved. In addition, the target mark can make it convenient for the user to read the unread message, and a user operation is facilitated.

In addition, some embodiments of the present disclosure may further provide a target mark used to process the unread message, an input operation performed by the user for the target mark to process the unread message is received, and the unread message is processed in response to the input operation. For example, an unread message is a payment message, and an input operation performed on a target mark used for payment is received for payment.

Figure 4:
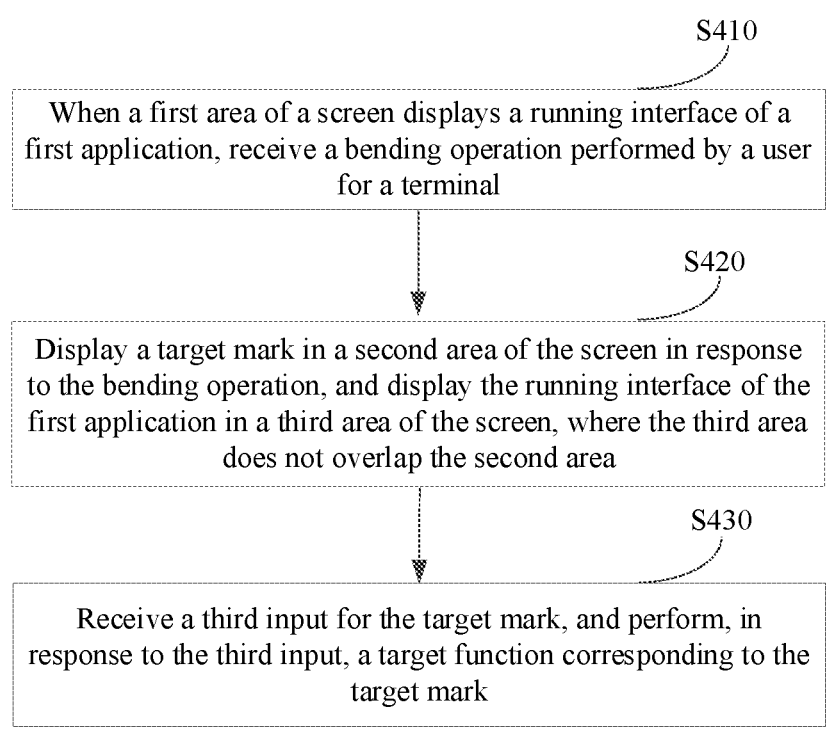
FIG. 4 is another schematic flowchart of a display method according to some embodiments of the present disclosure.

FIG. 4 is another schematic flowchart of a display method according to some embodiments of the present disclosure. The method may be performed by an electronic device, for example, a terminal device. In other words, the method may be performed by software or hardware installed on the terminal device. As shown in the figure, the method may include the following steps.

S410: In a case that a first area of a screen displays a running interface of a first application, receive a bending operation performed by a user for the terminal.

The terminal device has a flexible screen. The flexible screen is a screen made of a material such as an organic light-emitting diode (OLED), and is characterized by a capability of being bendable (collapsible).

The first application may include, for example, a video APP or a game APP. When the screen of the terminal is in an unbent state, when the first area of the screen displays the running interface of the first application, the bending operation performed by the user for the terminal is received, and the terminal is bent.

S420: In response to the bending operation, display a target mark in a second area of the screen, and display the running interface of the first application in a third area of the screen, where the third area does not overlap the second area.

Figure 5A:
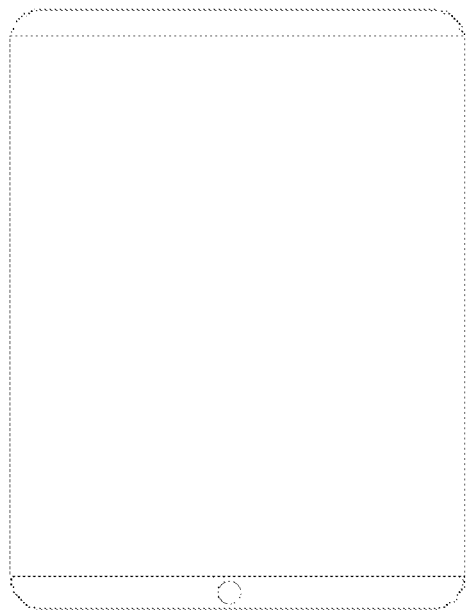
FIG. 5a is a schematic diagram of a flexible screen of a terminal in an unbent state.
Figure 5B:
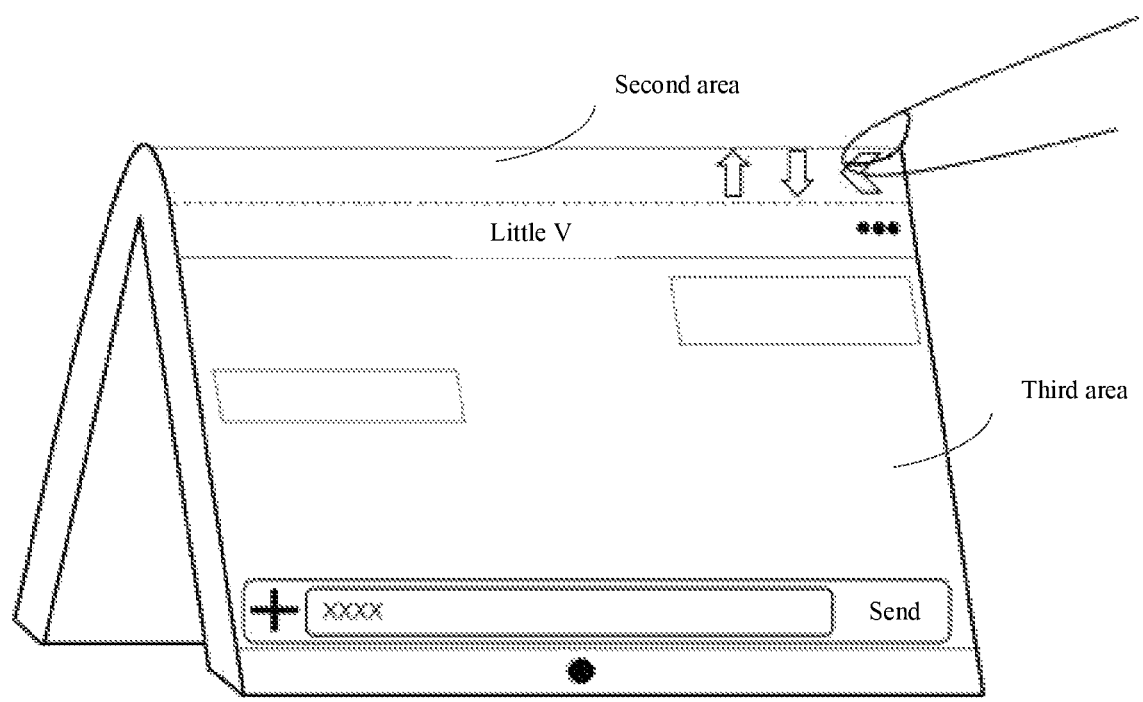
FIG. 5b is a schematic diagram of a flexible screen of a terminal in a bent state.

FIG. 5a is a schematic diagram of a flexible screen of a terminal in an unbent state. FIG. 5b is a schematic diagram of a flexible screen of a terminal in a bent state. The second area in which the flexible screen of the terminal is in the bent state does not overlap the third area.

In addition, in an implementation, radian of the second area of the flexible screen of the terminal may be greater than a preset radian threshold, and radian of the third area of the flexible screen of the terminal in the bent state may be less than the preset radian threshold.

It should be noted that, when the flexible screen of the terminal is in the bent state, the screen has radian due to bending. Generally, if the screen has slight radian, displayed content has slight deformation that is not easy to be detected by the user, and visual experience of the user is not affected. However, in an area with large radian on the screen, excessive deformation of the displayed content affects visual experience of the user. Therefore, the area with large radian on the screen is not suitable for displaying the running interface of the first application.

In some embodiments of the present disclosure, the radian threshold is used: the second area whose radian is greater than the radian threshold is not suitable for displaying the running interface of the first application, and the third area whose radian is less than the radian threshold is suitable for displaying the running interface of the first application. In some embodiments of the present disclosure, the running interface of the first application is displayed by using the third area in which the flexible screen of the terminal is in the bent state, so that the user can obtain good visual experience. In addition, in some embodiments of the present disclosure, the target mark is displayed by using the second area in which the flexible screen of the terminal is in the bent state, so that the second area whose radian is greater than the preset radian threshold can be properly used. Although the second area is not suitable for displaying display content such as a video, the second area may be used to display the target mark. Generally, the target mark is small in size, and is generally a small rectangle or a small icon. Even if large deformation occurs, the user does not have a particularly bad visual feeling. Therefore, in some embodiments of the present disclosure, the target mark is displayed by using the second area in which the flexible screen of the terminal is in the bent state, so that the running interface of the first application can be prevented from being occupied, thereby improving visual experience of a user, screen space can be used properly, and screen utilization can be improved.

The target mark in this step is used to indicate the target function, and the target function is a function item included in the first application.

In an implementation, the first application may be a multimedia play application, and the target function may be a play control function for the first application, including a play speed, play switching, and the like, or the target function may be a volume adjustment function for the first application, or the target function may be a display brightness adjustment function for the first application.

In an implementation, the first application may be a game application, and the target function may be a game control function for the first application, including a game picture play speed, game scenario switching, and the like, or the target function may be a volume adjustment function for the first application, or the target function may be a display brightness adjustment function for the first application.

In an implementation, the first application may be a photographing application, and the target function may be a parameter adjustment function for the first application, including a photographing speed, photographing manner switching, and the like, or the target function may be a volume adjustment function for the first application, or the target function may be a display brightness adjustment function for the first application.

S430: Receive a third input for the target mark, and perform, in response to the third input, a target function corresponding to the target mark.

Therefore, in the display method provided in some embodiments of the present disclosure, the target mark and the running interface of the first application can be separately displayed by using areas that are not overlapped with each other, to prevent the user's vision from being disturbed when the running interface of the first application is displayed, and visual experience of the user is improved. In addition, an operation of triggering the target function can be identified in time, the target function can be performed in time, and operation efficiency of the user can be improved.

Figure 6:
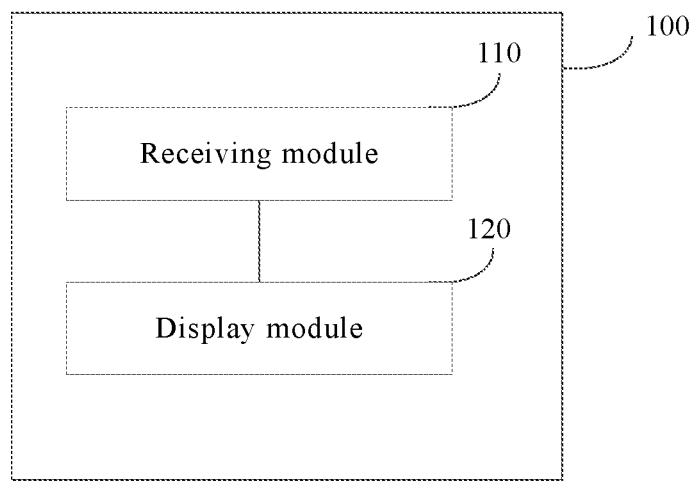
FIG. 6 is a schematic structural diagram of a terminal device according to some embodiments of the present disclosure.

FIG. 6 is a schematic structural diagram of a terminal device according to some embodiments of the present disclosure. The terminal device 100 includes a receiving module 110 and a display module 120.

The receiving module 110 is configured to: in a case that a first area of a screen displays a running interface of a first application, receive a bending operation performed by a user for the terminal. The display module 120 is configured to: in response to the bending operation, display a target mark in a second area of the screen, and display the running interface of the first application in a third area of the screen, where the third area does not overlap the second area. The target mark is used to indicate at least one of an unread message, a second application, or a target function.

In a possible implementation, the second application is an application associated with the first application, or the second application is an application that is started for more times in a preset time period, or the second application is an application running in the background.

Figure 7:
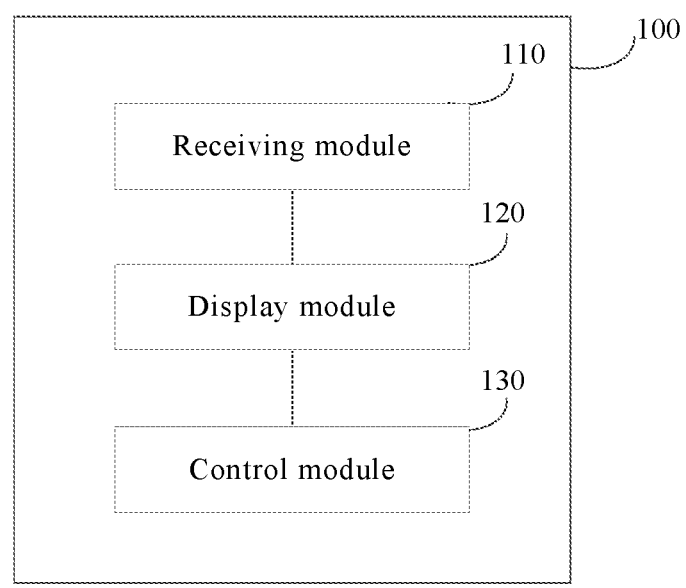
FIG. 7 is a schematic structural diagram of a terminal device according to some embodiments of the present disclosure.

FIG. 7 is a schematic structural diagram of a terminal device according to some embodiments of the present disclosure. The terminal device 100 includes a receiving module 110, a display module 120, and a control module 130.

In a possible implementation, the second application is the same as the first application, and the receiving module 110 is further configured to receive a first input for the target mark. The control module 130 is configured to: in response to the first input, control the first application to run in the background, or control the first application to exit running.

In a possible implementation, the receiving module 110 is further configured to: in a case that the target mark is used to indicate an unread message, receive a second input for the target mark. The display module 120 is further configured to display specific content of the unread message in the second area in response to the second input.

In a possible implementation, the target function is at least one of an identity authentication function, a terminal shutdown function, or a terminal restarting function.

In a possible implementation, the target mark is used to indicate the target function, and the target function is a function item included in the first application.

In a possible implementation, the first application is a multimedia play application, and the target function is a play control function for the first application, or a volume adjustment function for the first application, or a display brightness adjustment function for the first application.

The terminal device 100 provided in some embodiments of the present disclosure may perform the methods in the foregoing method embodiments, and implement functions and beneficial effects of the methods in the foregoing method embodiments. Details are not described herein again.

Figure 8:
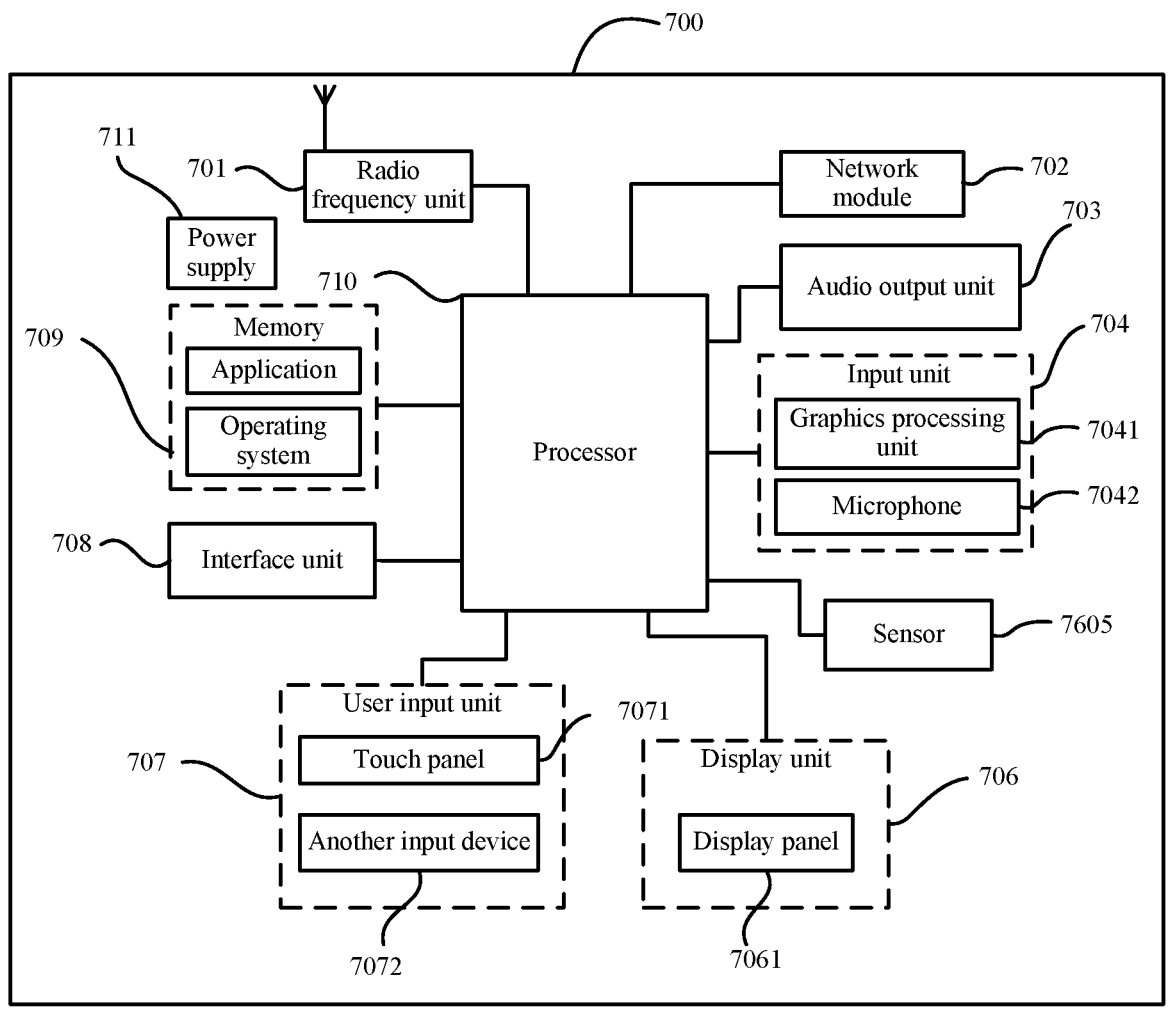
FIG. 8 is a schematic diagram of a hardware structure of an electronic device that performs a display method according to some embodiments of the present disclosure.

FIG. 8 is a schematic diagram of a hardware structure of an electronic device that performs a display method according to some embodiments of the present disclosure. As shown in the figure, the mobile terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that a structure of the mobile terminal shown in the figure does not constitute a limitation on the mobile terminal, and the mobile terminal may include more or fewer components than those shown in the figure, or combine some components, or have different component arrangements. In this embodiment of the present disclosure, the mobile terminal includes but is not limited to a mobile phone, a tablet computer, a laptop computer, a palmtop computer, an in-vehicle terminal, a wearable device, a pedometer, and the like.

The processor 710 is configured to: in a case that a first area of a screen displays a running interface of a first application, receive a bending operation performed by a user for the terminal; and in response to the bending operation, display a target mark in a second area of the screen, and display the running interface of the first application in a third area of the screen, where the third area does not overlap the second area. The target mark is used to indicate at least one of an unread message, a second application, or a target function.

The terminal that performs the display method described in the embodiments of this disclosure may perform the methods described in the foregoing method embodiments, and implement functions and beneficial effects of the methods described in the foregoing method embodiments. Details are not described herein again.

It should be understood that, in this embodiment of the present disclosure, the radio frequency unit 701 may be configured to receive and send information or receive and send a signal in a call process. For example, after downlink data from a base station is received, the processor 710 processes the downlink data. In addition, uplink data is sent to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communication system.

The mobile terminal provides wireless broadband Internet access for a user by using a network module 702, for example, helping the user send and receive an email, browsing a web page, and accessing streaming media.

The audio output unit 703 may convert audio data received by the radio frequency unit 701 or the network module 702 or stored in the memory 709 into an audio signal and output as sound. In addition, the audio output unit 703 may further provide audio output (for example, call signal receiving sound or message receiving sound) related to a specific function performed by the mobile terminal 700. The audio output unit 703 includes a loudspeaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a static picture or a video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive sound and can process such sound into audio data. The processed audio data may be output by being converted into a format that may be sent to a mobile communications base station by using the radio frequency unit 701 in a telephone call mode.

The mobile terminal 700 further includes at least one sensor 705, such as an optical sensor, a motion sensor, and another sensor. The optical sensor includes an ambient light sensor and a proximity sensor. The ambient light sensor may adjust luminance of the display panel 7061 based on brightness of ambient light, and the proximity sensor may disable the display panel 7061 and/or backlight when the mobile terminal 700 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. The infrared sensor can measure a distance between an object and the mobile terminal by transmitting and receiving infrared rays. Details are not described herein again. There may be two pressure sensors that are respectively disposed on a front screen and a rear screen of the terminal, to separately detect touch operations from the front screen and the rear screen of the terminal.

The display unit 706 is configured to display information entered by the user or information provided for the user. The display unit 706 may include a display panel 7061, and the display panel 7061 may be configured in a form of a liquid crystal display (LCD), an organic light-emitting diode (OLED), or the like.

The user input unit 707 may be configured to receive input digit or character information and generate key signal input related to user setting and function control of the mobile terminal. The user input unit 707 includes a touch panel 7071 and another input device 7072. The touch panel 7071, also referred to as a touchscreen, may collect a touch operation performed by the user for or near the touch panel 7071 (for example, an operation performed by the user for or near the touch panel 7071 by using any suitable object or accessory such as a finger or a stylus). The touch panel 7071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 710, and can receive and execute a command sent by the processor 710. In addition, the touch panel 7071 may be implemented by using multiple types such as a resistive type, a capacitive type, an infrared ray, and a surface acoustic wave. The user input unit 707 may include another input device 7072 in addition to the touch panel 7071. The another input device 7072 may include but is not limited to a physical keyboard, a function key (such as a volume control key or an on/off key), a trackball, a mouse, a joystick, and the like. Details are not described herein.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are used as two independent components to implement input and output functions of the mobile terminal. However, in some embodiments, the touch panel 7071 and the display panel 7061 may be integrated to implement the input and output functions of the mobile terminal. This is not specifically limited herein.

The interface unit 708 is an interface connecting an external apparatus to the mobile terminal 700. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 708 may be configured to receive input (for example, data information and power) from the external apparatus and transmit the received input to one or more elements in the mobile terminal 700, or may be configured to transmit data between the mobile terminal 700 and the external apparatus.

The memory 709 may be configured to store a software program and various data. The memory 709 may mainly include a program storage area and a data storage area. The program storage area may store an operating system, an application required by at least one function (such as a sound play function or an image play function), and the like. The data storage area may store data (such as audio data or an address book) or the like created based on use of the mobile phone. In addition, the memory 709 may include a high-speed random access memory, and may further include a non-volatile memory such as at least one magnetic disk storage component, a flash memory component, or another volatile solid-state storage component.

The processor 710 is a control center of the mobile terminal, and is connected to all parts of the entire mobile terminal by using various interfaces and lines, and performs various functions of the mobile terminal and processes data by running or executing the software program and/or the module that are stored in the memory 709 and invoking the data stored in the memory 709, to implement overall monitoring on the mobile terminal. The processor 710 may include one or more processing units. Optionally, the processor 710 may be integrated with an application processor and a modem processor. The application processor mainly processes an operating system, a user interface, an application, and the like, and the modem processor mainly processes wireless communication. It may be understood that the modem processor may also not be integrated into the processor 710.

The mobile terminal 700 may further include a power supply 711 (such as a battery) that supplies power to each component. Optionally, the power supply 711 may be logically connected to the processor 710 by using a power management system, to implement functions such as charging, discharging, and power consumption management by using the power management system.

In addition, the mobile terminal 700 includes some function modules not shown, and details are not described herein.

Optionally, an embodiment of the present disclosure further provides a mobile terminal, including a processor 710, a memory 709, and a program that is stored in the memory 709 and executable on the processor 710. When the program is executed by the processor 710, each process of the foregoing display method embodiments can be implemented, and a same technical effect can be achieved. To avoid repetition, details are not described herein.

Some embodiments of the present disclosure further provide a non-transitory computer-readable storage medium, where the non-transitory computer-readable medium stores one or more programs, and when the one or more programs are executed by a terminal including multiple applications, the terminal performs the following operations: in a case that a first area of a screen displays a running interface of a first application, receiving a bending operation performed by a user for the terminal; and in response to the bending operation, display a target mark in a second area of the screen, and display the running interface of the first application in a third area of the screen, where the third area does not overlap the second area; where the target mark is used to indicate at least one of an unread message, a second application, or a target function.

The non-transitory computer-readable storage medium includes a read-only memory (ROM), a random access memory (RAM), a magnetic disk, an optical disc, or the like.

The computer program implements each process of the foregoing display method when being executed by the processor, and can achieve a same technical effect. To avoid repetition, details are not described herein again.

Further, some embodiments of the present disclosure further provide a computer program product, where the computer program product includes a computer program stored in a non-transitory computer-readable storage medium, the computer program includes a program instruction, and when the program instruction is executed by a computer, the following procedure is implemented: in a case that a first area of a screen displays a running interface of a first application, receiving a bending operation performed by a user for the terminal; and in response to the bending operation, display a target mark in a second area of the screen, and display the running interface of the first application in a third area of the screen, where the third area does not overlap the second area; where the target mark is used to indicate at least one of an unread message, a second application, or a target function.

The computer program implements each process of the foregoing display method when being executed by the processor, and can achieve a same technical effect. To avoid repetition, details are not described herein again.

A person skilled in the art should understand that the embodiments of the present disclosure may be provided as methods, systems, or computer program products. Therefore, the present disclosure may be in a form of a complete hardware embodiment, a complete software embodiment, or an embodiment incorporating software and hardware aspects. Furthermore, the present disclosure may be in a form of a computer program product implemented on one or more computer-usable storage mediums (including but not limited to a disk memory, a CD-ROM, an optical memory, and the like) including computer-usable program code.

It may be understood that the embodiments described in some embodiments of the present disclosure may be implemented by hardware, software, firmware, middleware, microcode, or a combination thereof. For hardware implementation, a module, a unit, a submodule, a subunit, or the like may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a microcontroller, a microprocessor, another electronic unit configured to perform the functions described in this application, or a combination thereof.

The present disclosure is described with reference to a flowchart and/or block diagram of a method, a device (system), and a computer program product according to embodiments of the present disclosure. It is to be understood that each process and/or block in the flowcharts and/or block diagrams, and a combination of processes and/or blocks in the flowcharts and/or block diagrams may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes in the flowcharts and/or one or more blocks in the block diagrams.

These computer program instructions may also be stored in a computer-readable memory that can instruct the computer or another programmable data processing device to work in a specific manner, so that an instruction stored in the computer-readable memory generates a manufacturer including an instruction apparatus, and the instruction apparatus implements a function specified in one or more processes in the flowcharts and/or one or more blocks in the block diagrams.

These computer program instructions may also be loaded onto the computer or another programmable data processing device such that a series of operation steps are performed on the computer or another programmable device to produce computer-implemented processing, so that instructions executed on the computer or other programmable device provides steps for implementing the functions specified in one or more processes in the flowcharts and/or one or more blocks in the block diagrams.

In a typical configuration, the computing device includes one or more processors (CPUs), an input/output interface, a network interface, and a memory.

The memory may include a form such as a non-permanent memory, a random access memory (RAM), and/or a non-volatile memory in the non-transitory computer-readable medium, such as a read-only memory (ROM) or a flash memory (flash RAM). The memory is an example of the computer-readable medium.

The non-transitory computer-readable medium includes permanent and non-permanent, removable and non-removable mediums, and may store information by using any method or technology. The information may be a computer-readable instruction, a data structure, a module of a program, or other data. Examples of storage mediums of the computer include, but are not limited to, a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a read-only memory (CD-ROM), a digital versatile optical disk (DVD) or another optical storage, a magnetic cassette tape, a magnetic tape magnetic disk storage or another magnetic storage device or any other non-transmission medium, and may be configured to store information accessible to the computing device. As defined herein, the computer readable medium does not include transitory media, such as a modulated data signal and a carrier.

It should be further noted that, the term "include", "including", or any other variant is intended to cover non-exclusive inclusion, so that a process, method, product, or device that includes a series of elements includes not only those elements but also other elements that are not explicitly listed, or may further include elements inherent to such a process, method, product, or device. In the absence of more restrictions, an element defined by the statement "including a . . . " does not exclude another same element in a process, method, product, or device that includes the element.

A person skilled in the art should understand that the embodiments of the present disclosure may be provided as methods, systems, or computer program products. Therefore, the present disclosure may be in a form of a complete hardware embodiment, a complete software embodiment, or an embodiment incorporating software and hardware aspects. Furthermore, the present disclosure may be in a form of a computer program product implemented on one or more computer-usable storage mediums (including but not limited to a disk memory, a CD-ROM, an optical memory, and the like) including computer-usable program code.

The foregoing descriptions are merely embodiments of the present disclosure, and are not intended to limit the present disclosure. For a person skilled in the art, various changes and variations may be made in the present disclosure. Any modification, equivalent replacement, and improvement made in the spirit and principles of the present disclosure shall be included in the scope of the claims of the present disclosure.

What is claimed is:

1. A display method, applied to a terminal and comprising:
in a case that a first area of a screen displays a running interface of a first application, receiving a bending operation performed by a user for the terminal; and
in response to the bending operation, displaying a target mark in a second area of the screen, and displaying the running interface of the first application in a third area of the screen, wherein the third area does not overlap the second area; wherein
the target mark is used to indicate at least one of an unread message, a second application, or a target function.

2. The display method according to claim 1, wherein the second application is an application associated with the first application, or the second application is an application that is started for more times in a preset time period, or the second application is an application running in the background.

3. The display method according to claim 1, wherein the second application is a same as the first application, and the method further comprises:
receiving a first input for the target mark; and
in response to the first input, controlling the first application to run in the background, or controlling the first application to exit running.

4. The display method according to claim 1, wherein in a case that the target mark is used to indicate an unread message, the method further comprises:
receiving a second input for the target mark; and
displaying specific content of the unread message in the second area in response to the second input.

5. The display method according to claim 1, wherein the target function is at least one of an identity authentication function, a terminal shutdown function, or a terminal restarting function.

6. The display method according to claim 1, wherein the target mark is used to indicate the target function, and the target function is a function item comprised in the first application.

7. The display method according to claim 6, wherein the first application is a multimedia play application, and the target function is a play control function for the first application, or a volume adjustment function for the first application, or a display brightness adjustment function for the first application.

8. A terminal device, comprising: a memory, a processor, and a program that is stored in the memory and executable on the processor, wherein the program, when executed by the processor, causes the terminal device to perform:
in a case that a first area of a screen displays a running interface of a first application, receiving a bending operation performed by a user for the terminal; and
in response to the bending operation, displaying a target mark in a second area of the screen, and displaying the running interface of the first application in a third area of the screen, wherein the third area does not overlap the second area; wherein
the target mark is used to indicate at least one of an unread message, a second application, or a target function.

9. The terminal device according to claim 8, wherein the second application is an application associated with the first application, or the second application is an application that is started for more times in a preset time period, or the second application is an application running in the background.

10. The terminal device according to claim 8, wherein the second application is a same as the first application, and the program, when executed by the processor, causes the terminal device to further perform:
receiving a first input for the target mark; and
in response to the first input, controlling the first application to run in the background, or controlling the first application to exit running.

11. The terminal device according to claim 8, wherein in a case that the target mark is used to indicate an unread message, the program, when executed by the processor, causes the terminal device to further perform:
receiving a second input for the target mark; and
displaying specific content of the unread message in the second area in response to the second input.

12. The terminal device according to claim 8, wherein the target function is at least one of an identity authentication function, a terminal shutdown function, or a terminal restarting function.

13. The terminal device according to claim 8, wherein the target mark is used to indicate the target function, and the target function is a function item comprised in the first application.

14. The terminal device according to claim 13, wherein the first application is a multimedia play application, and the target function is a play control function for the first application, or a volume adjustment function for the first application, or a display brightness adjustment function for the first application.

15. A non-transitory computer-readable storage medium, wherein the non-transitory computer-readable storage medium is configured to store a computer-executable instruction, and the computer-executable instruction, when executed by a processor of a terminal device, causes the terminal device to perform:
in a case that a first area of a screen displays a running interface of a first application, receiving a bending operation performed by a user for the terminal; and
in response to the bending operation, displaying a target mark in a second area of the screen, and displaying the running interface of the first application in a third area of the screen, wherein the third area does not overlap the second area; wherein
the target mark is used to indicate at least one of an unread message, a second application, or a target function.

16. The non-transitory computer-readable storage medium according to claim 15, wherein the second application is an application associated with the first application, or the second application is an application that is started for more times in a preset time period, or the second application is an application running in the background.

17. The non-transitory computer-readable storage medium according to claim 15, wherein the second application is a same as the first application, and the computer-executable instruction, when executed by the processor, causes the terminal device to further perform:
receiving a first input for the target mark; and in response to the first input, controlling the first application to run in the background, or controlling the first application to exit running.

18. The non-transitory computer-readable storage medium according to claim 15, wherein in a case that the target mark is used to indicate an unread message, the computer-executable instruction, when executed by the processor, causes the terminal device to further perform:
   receiving a second input for the target mark; and
   displaying specific content of the unread message in the second area in response to the second input.

19. The non-transitory computer-readable storage medium according to claim 15, wherein the target function is at least one of an identity authentication function, a terminal shutdown function, or a terminal restarting function; and/or
   the target mark is used to indicate the target function, and the target function is a function item comprised in the first application.

20. The non-transitory computer-readable storage medium according to claim 19, wherein the first application is a multimedia play application, and the target function is a play control function for the first application, or a volume adjustment function for the first application, or a display brightness adjustment function for the first application.

* * * * *